(12) United States Patent
Babanezhad

(10) Patent No.: US 7,817,711 B2
(45) Date of Patent: Oct. 19, 2010

(54) DELAY LINE CORRELATOR

(75) Inventor: Joseph N. Babanezhad, Cupertino, CA (US)

(73) Assignee: Plato Networks, Inc., Santa Clara, CA (US)

( * ) Notice: Subject to any disclaimer, the term of this patent is extended or adjusted under 35 U.S.C. 154(b) by 1027 days.

(21) Appl. No.: 11/509,495

(22) Filed: Aug. 23, 2006

(65) Prior Publication Data

US 2008/0122555 A1     May 29, 2008

(51) Int. Cl.
*H03K 5/159* (2006.01)

(52) U.S. Cl. .................................... 375/229

(58) Field of Classification Search ............... 375/229, 375/343; 333/18, 28 R
See application file for complete search history.

(56) References Cited

U.S. PATENT DOCUMENTS

| 5,734,680 | A * | 3/1998 | Moore et al. ............... 375/263 |
| 7,167,516 | B1 * | 1/2007 | He ............................ 375/232 |
| 2004/0037305 | A1 * | 2/2004 | Wildhagen et al. ......... 370/432 |
| 2007/0126487 | A1 * | 6/2007 | Sartschev et al. .......... 327/276 |

* cited by examiner

*Primary Examiner*—Don N Vo
(74) *Attorney, Agent, or Firm*—Blakely, Sokoloff, Taylor & Zafman LLP

(57) ABSTRACT

A circuit for the analog correlation of a 2.5 GHz signal to remove impairments such as echo, cross talk and intersymbol interference is described. Loop stability in a loop which generates an error signal and tap weights is achieved by providing a further delay from the taps of the delay line.

26 Claims, 4 Drawing Sheets

DELAY LINE CORRELATOR

FIELD OF THE INVENTION

The invention relates to the field of analog signal processing.

PRIOR ART AND RELATED ART

Digital signal processing (DSP) is widely used to process data carrying signals to remove, for example, inter-symbol interference (ISI), echo, cross talk and other impairments, and to provide filtering, correlation and other processing. Typically, after some analog filtering and amplification, the analog signal is converted to a digital signal for the DSP. The design of the analog-to-digital (A-to-D) converter can become critical particularly as baud rates increase. In fact, in some applications the design of an A-to-D converter may be considered to be a limiting factor.

The problems associated with the prior art will be described in more detail in conjunction with FIG. 1. As will be seen, the present invention alleviates these problems by processing in the analog domain before converting into the digital domain.

SUMMARY OF THE INVENTION

A method and apparatus are described for processing an input analog signal X(t) in the analog domain. In the method of the present invention, the input signal is delayed in a plurality of serial analog stages. The signal tapped from each of the stages (n) is further delayed and combined with an analog error signal to provide a plurality of analog tap weights $W_n$. The signal from a stage n is then combined with the tap weight $W_n$ for that stage. A summing occurs of the plurality of signals $X_n W_n$ to provide a signal Y(t). Slicing of the summed signal is used to generate the error signal. The further delay provides stability needed because of the feedback loop which includes the generation of the error signal and tap weights.

In one embodiment, the further delaying of a signal from a stage n is provided by using a signal from stage n+a, where a is a positive integer.

DETAILED DESCRIPTION

A method and apparatus for processing an analog signal is described. In the following description, numerous specific details are set forth, such as specific frequencies, in order to provide a thorough understanding of the present invention. It will be apparent to one skilled in the art, that the present invention may be practiced without these specific details. In other instances, well-known circuit elements, such as amplifiers and multipliers, are not described in detail in order to not unnecessarily obscure the present invention.

Figure 1:
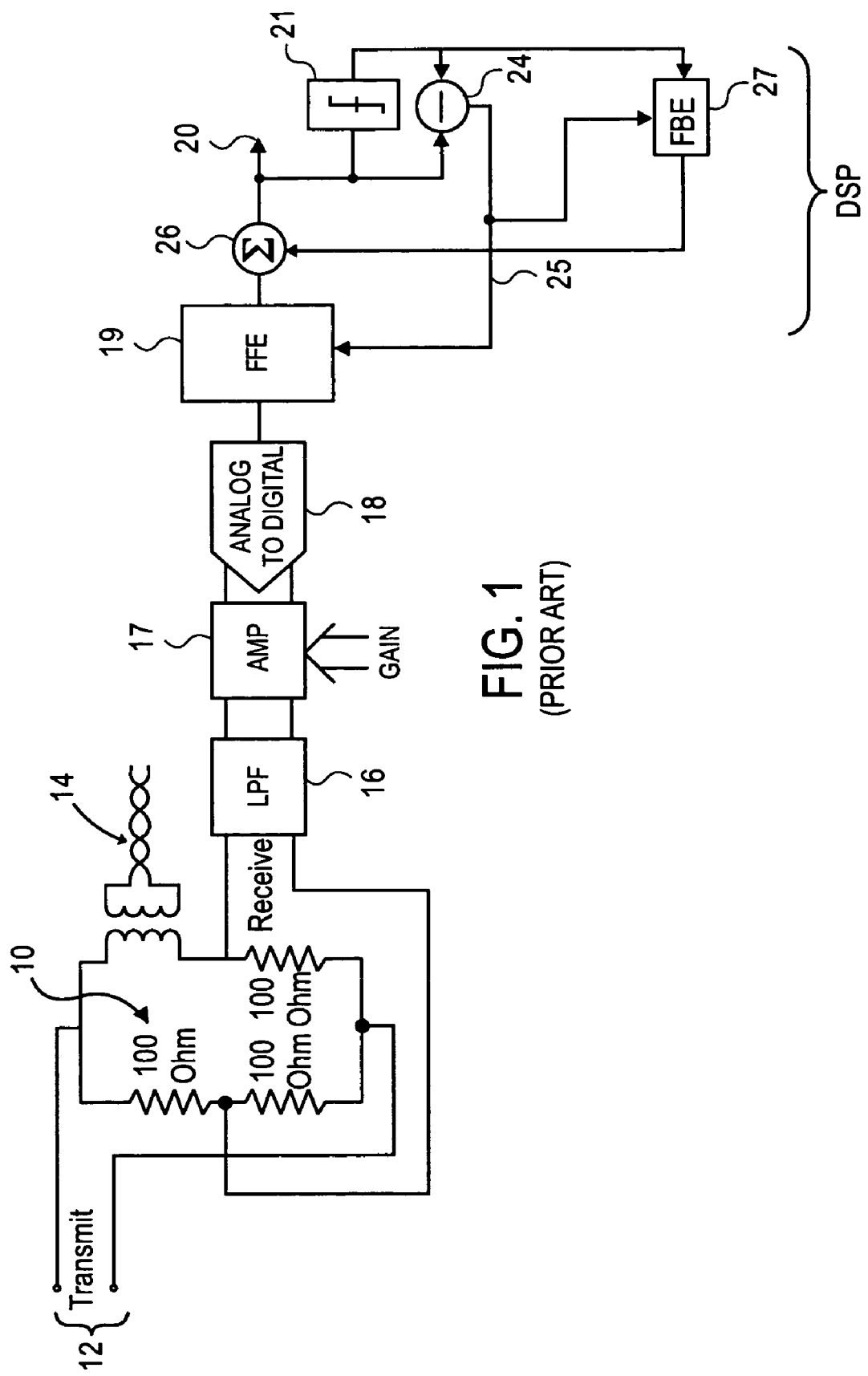
FIG. 1 is a block diagram showing the processing associated with a prior art DSP system.

Prior Art of FIG. 1

FIG. 1 illustrates a somewhat typical arrangement for DSP of a signal received over a twisted pair 14. The signal from the twisted pair is coupled to a duplexing circuit 10. As can be seen, the duplexing circuit has transmit leads 12, as well as a pair of receive leads connected to a low pass filter 16. By way of example, the twisted pair 14 may be receiving a 2.5 Gb/sec signal, modulated with a 16-pulse amplitude modulated (PAM) symbol providing an effective baud rate of 800 MHz. The analog low pass filter 16 limits the frequency range to frequencies suitable for the A-to-D converter 18. Similarly, the analog amplifier 17, provides an amplitude range generally falling within the range manageable by the A-to-D converter 18. For the example described above, the A-to-D converter 18 may have a sampling rate of 800 MHz and provide 10 or 11 effective number of bits (ENOB) of digital data to a DSP section which includes a decision modified feedback equalizer.

The DSP input is to a feed forward equalizer 19 to remove such impairments as ISI caused by insertion loss. The output of equalizer 19 is summed with an output from the feedback equalizer 27. An error signal is used by the DSP section which is developed through a slicer 21. The input and output of the slicer 21 are subtracted from one another by the subtractor 24 to provide an error signal on line 25. This error signal is coupled to both equalizers 19 and 27. A digital output signal is provided on line 20.

The signal-to-noise ratio for the arrangement of FIG. 1 is a function of the near end and far end echo, self and alien crosstalk, line noise, uncancelled impairments such as resulting from line loss, and the quantization noise introduced by the A-to-D converter 18. For the most part, the quantization noise is the result of clock jitter, which is a particularly troublesome at high frequencies such as the 800 MHz described above. As it turns out, the A-to-D converter 18 is difficult to realize, if the quantization noise is to be kept low.

Figure 2:
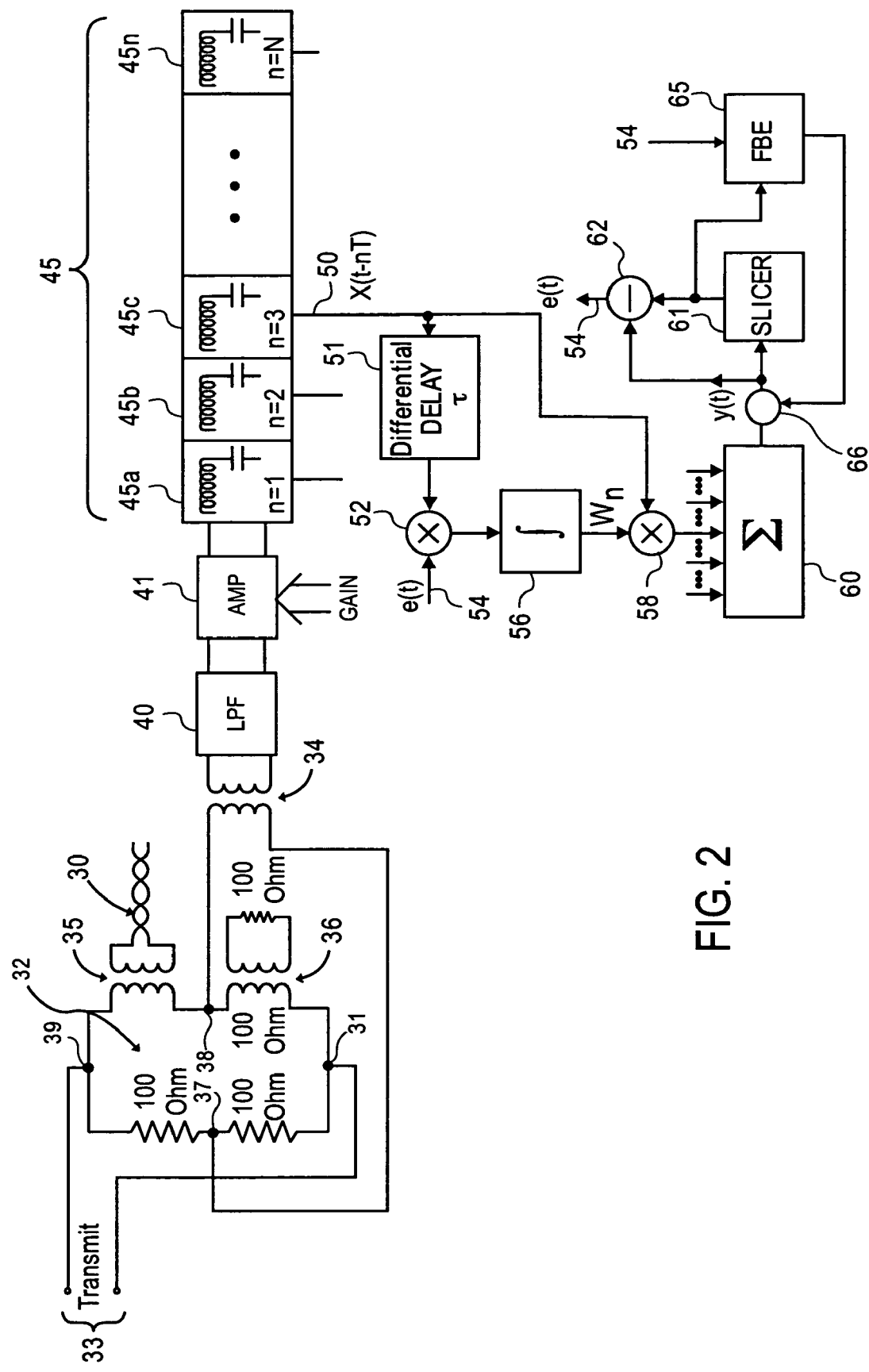
FIG. 2 is a block diagram illustrating an embodiment of the present invention.

As will be seen in conjunction with FIG. 2, many of the signal impairments removed in the digital domain for the arrangement of FIG. 1 are removed in the analog domain as taught by the present invention. With the present invention, when the input signal is finally digitized, lower ENOB is required and as a result, the A-to-D converter design is more manageable.

Embodiment of FIG. 2

In FIG. 2, the input/output signals are transmitted/received over the twisted pair 30 which is coupled through the transformer 35 to the duplexing circuit 32. The output signal to the twisted pair 30 is coupled to circuit 32 through leads 33, which are common with nodes 31 and 39 of the circuit 32. The input signal is received from the twisted pair 30 at the nodes 37 and 38. A resistor (100 ohms in one embodiment) is coupled between the nodes 39 and 37, and another resistor is coupled between the nodes 31 and 37. The transformer 35 is coupled between the nodes 38 and 39. Another 100 ohm resistor is coupled to the secondary winding of a transformer 36. The primary winding of this one-to-one transformer is coupled between the nodes 31 and 38 of the circuit 32. Both the transformers 35 and 36 are high frequency transformers, for instance in one embodiment, for coupling frequencies in the GHz range.

Figure 4:
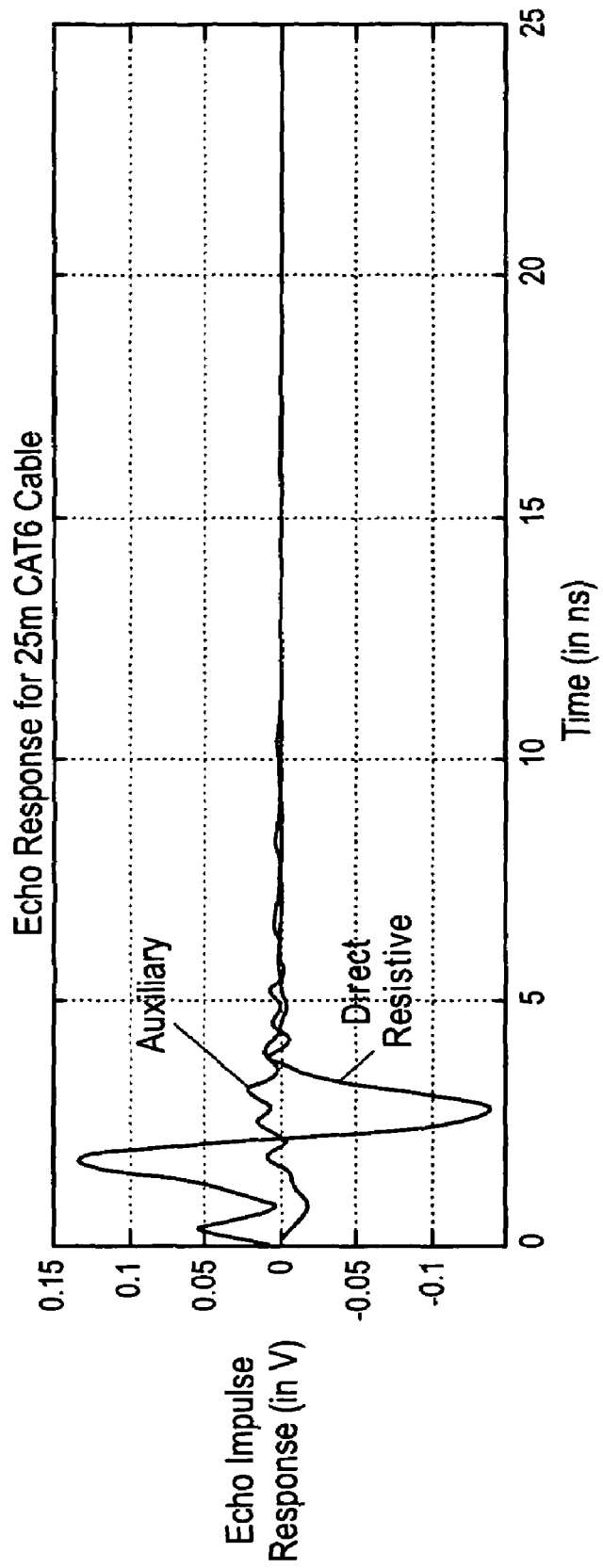
FIG. 4 are impulse responses comparing the performance of duplexing circuits shown in FIGS. 1 and 2.

Unlike the duplexing circuit of FIG. 1, the duplexing circuit 32 of FIG. 2 includes the transformer 36 for coupling to a resistor into the circuit. As will be discussed later, because of the transformer 36, the circuit 32 provides better echo response as illustrated in FIG. 4.

The input signal from the circuit 32 is coupled to a low pass filter 40 through the high frequency transformer 34. This may be an ordinary analog low pass filter such as typically used to limit the high frequencies of a signal which is subsequently digitized. Generally, frequencies higher than those that can be faithfully digitized are removed.

The output of the filter 40 is coupled to an amplifier 41 which receives a gain control signal. The amplifier 41 may be an ordinary analog amplifier, such as used in DSP approach of FIG. 1. The amplifier 41 typically controls the gain of the received signal so that the amplified signal falls within a predetermined region of the operating characteristics of the circuits receiving the amplified signal.

The output of the amplifier 41 is coupled to an analog delay line 45. The delay line 45 has a plurality of stages such as stages 45a and 45b, each of which provides equal periods of delay. Each stage has one or more segments, each segment of which includes an inductor and a capacitor. This allows for a fractionally spaced equalizer as well as symbol spaced equalizers. For the illustrated embodiment, each stage has a single inductor and a single capacitor. Ideally the delay line 45 is lossless, although as a practical matter, there is some loss associated with each of the stages. For purposes of discussion, each of the stages are consecutively numbered from n=1 to n=N.

In a preferred embodiment, the entire delay line is fabricated from passive elements (inductors and capacitors) without amplification between stages. This reduces the noise that would otherwise occur and build up over the delay line. Ideally, the magnitude at each tap is constant with only the phase of the signal changing.

A signal at a tap from each stage of the delay line 45 is coupled to two combining circuits. Specifically in FIG. 2, tap 50 from stage 45c (n=3) is coupled to a multiplier 52 through a delay circuit 51, and is also coupled directly to a multiplier 58. The analog signal on line 50 is further delayed through the delay circuit 51 which again may be an LC circuit. The purpose of the delay circuit 51 is to maintain loop stability as will be discussed later. The output of the circuit 51 is multiplied by an error signal e(t) on line 54 within the multiplier 52.

The resultant analog signal from multiplier 52 is coupled to a integrator 56. The integrator 56, which may be an ordinary capacitance integrator, integrates the analog signal from the multiplier 52. In one embodiment, the integrator 56 has a time constant measured in microseconds for a received signal in the GHz range. Thus, this integration is relatively long with respect to the period of the received signal. The output of the integrator 56 is coupled as one input to the multiplier 58 and is multiplied by the signal from tap 50.

There is a delay circuit 51, two combining circuit and an integrator for each of the taps of the delay line 45. The outputs from the second combining circuits, such as the multiplier 58, are all summed in the summer 60. As will be discussed later, the output of a summer 66 provides the analog output signal, Y(t), which is the input signal X(t), after it has been processed to remove impairments.

The analog error signal on line 54 is developed by slicing the signal Y(t) in the slicer 61 and then subtracting the resultant signal from the input to the slicer in the subtractor 62. This results in an error signal which is used, as will be described, to develop the adaptive tap weights forming one input to the second combining circuit (e.g. multiplier 58).

The embodiment of FIG. 2 also includes a feedback equalizer (FBE) 65 which performs a similar function to the FBE 27 of FIG. 1. The FBE 65 receives the output of slicer 61, the signal e(t) on line 54 and provides an output to summer 66. FBE 65 may be fabricated with the same technology shown for the FFE in FIG. 2.

The circuitry of FIG. 2, except for the duplexing circuit 32, is realized as an integrated circuit using, for instance, conventional CMOS technology. Preferably, the integrated circuit includes circuitry other than that shown on FIG. 2. In one embodiment, the output from the summer 60 is coupled to an A-to-D converter, and converted into a digital signal for further processing. Unlike the prior art however, the A-to-D converter typically only requires an ENOB of 5 bits for subsequent processing. This is in contrast to ENOB of 10 or 11 bits required in the prior art, as shown in FIG. 1, for processing of the same input signal.

The circuitry of FIG. 2 provides a finite impulse response through the correlation that occurs between the weighting functions and the input signal. The following equation is implemented:

$$Y(t) = \Sigma W_n \cdot X(t-nT)$$

where Y(t) is the signal at the output of the summer 60, $W_n$ the adaptive tap weights, and X(t−nT), the input function at the taps for each stage n, where T is equal to the time delay of each of the stages. This equation can be expanded as follows:

$$Y(t) = W_0 X(t) + W_1(t-T) + W_2(t-2T) \ldots W_n(t-NT)$$

where N+1 is the total number of stages in the delay line. Each term in this equation has a value represented by the output of the second combining means such as the multiplier 58. The terms are then summed within the summer 60 to provide Y(t).

The tap weights for the embodiment of FIG. 2 may be written as:

$$W_n = \frac{1}{A} \int e(t) x(t - nT - \tau) dt$$

where 1/A is a constant, e(t) is the error signal on line 54, and $\tau$ is the delay provided by the differential delay 51. The integration shown in the above equation is performed by the integrator 56.

As may be noted from FIG. 2, the signal from tap 50 is essentially fed back to the multiplier 52 through the loop comprising the integrator 56, multiplier 58, summer 60, slicer 61, and then through the error signal coupled to the multiplier 52. If this feedback occurs too quickly, instability can occur since the feedback may cause the signal at the output of the multiplier 52 to continually rise or fall. The differential delay 51 is used to stabilize the circuitry. Ideally, the delay $\tau$ should be equal to the loop delay or, in practice, slightly more than the loop delay. Moreover, the delay from delay 51 may be made programmable. The delay, in this embodiment, may be adjusted once the circuit is fabricated to optimize the delay. L-C elements can be selected as needed by anyone of a plurality of devices, such as EEPROM cells, antifuses, or a bonding option to provide this programmability.

In DSP this loop stabilizing delay is not required. In the digital domain, an error signal value, for instance, can be readily stored and then used under the control of a timing signal, and thus, the feedback problem described above does not occur.

Figure 3:
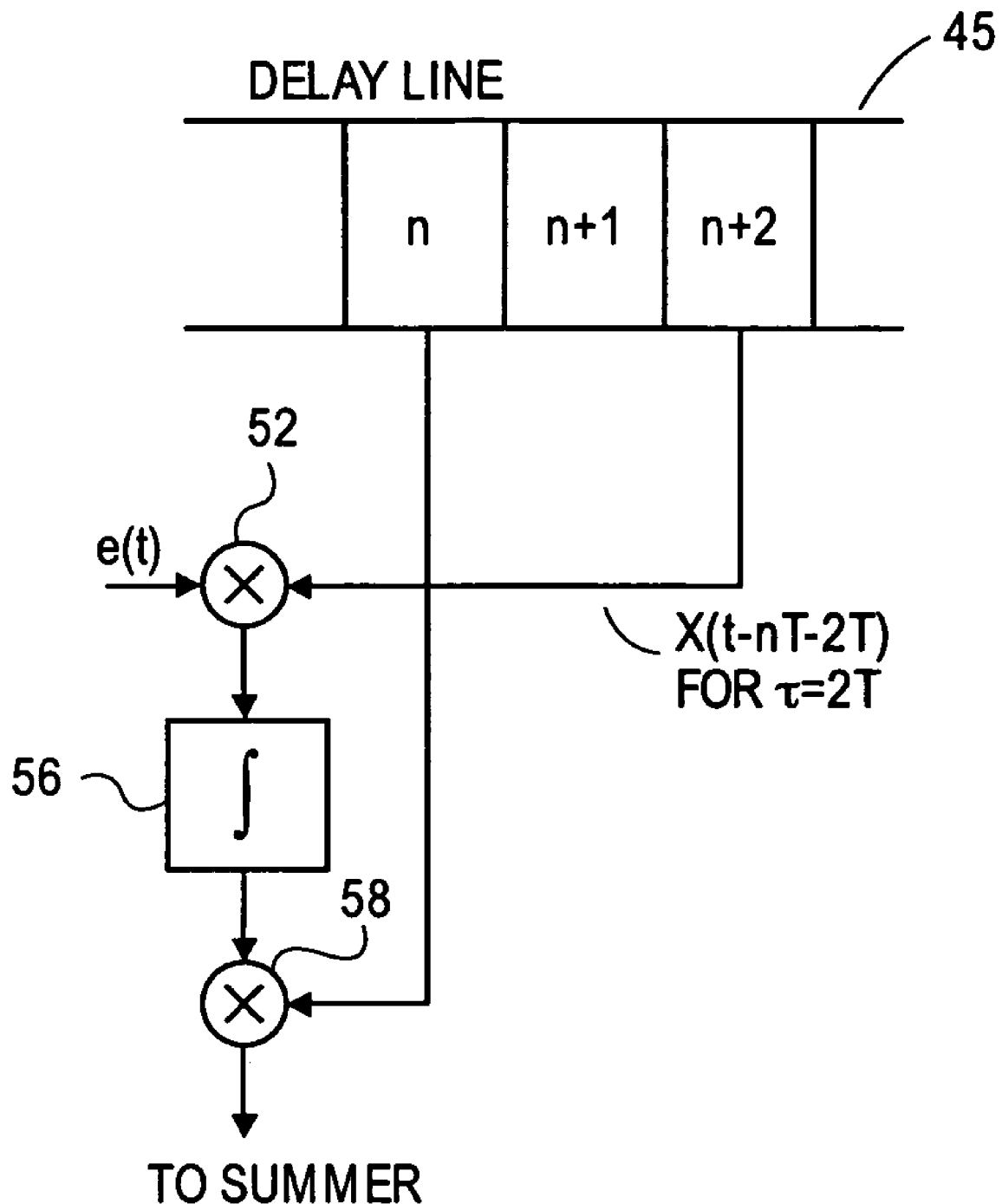
FIG. 3 is a block diagram illustrating an alternate method and apparatus for obtaining a delayed signal used for developing the adaptive tap weights also referred to below as the weighting functions.

An alternate embodiment is shown in FIG. 3. Again, the delay line 45 includes taps for stages n, n+1, and n+2. The multipliers 52 and 58, along with the integrator 56 as illustrated in FIG. 2, are also present in FIG. 3. The error signal is also illustrated coupled to the multiplier 52 and the tap from the stage n is coupled as one input to the multiplier 58. In the embodiment of FIG. 3, the delay 51 of FIG. 2 is not used. Rather, delay from the delay line 45 is used to provide the delay τ, previously discussed.

Assume that τ is equal to 2T. If this is the case, then the signal at the tap of stage n+2 provides the same delay as the differential delay 51 of FIG. 2. To obtain a more precise delay, part of the delay may be obtained from a tap on the delay line and additional delay may be obtained from a separate delay circuit such as the delay circuit 51 of FIG. 2. In this event, the delay circuit provides a delay less than T. Thus, if τ equaled 1.5 T, a tap from a segment of a stage may be used with an additional delay provided by a separate delay circuit. For this reason, for this embodiment, multiplier 52 may be coupled to receive a signal from one of the stages n+a of the delay line to provide the tap weight $W_n$, where a is a positive integer.

The inductors of FIG. 2 may be fabricated on-chip in, for instance, one or more metal layers. Alternatively, they may be realized from the delays associated with a transmission line, such as from a relatively long trace on a chip. Also, the inductors can be fabricated on a separate chip/substrate from the other elements of the circuit of FIG. 2 and connected, for example, in a flip-chip package. The inductors may be additionally be realized as discrete elements connected to the chip having the other elements of FIG. 2 in a hybrid IC arrangement.

Performance of the Duplexing Circuit

The performance of the duplexing circuits of FIGS. 1 and 2 are compared in the graph of FIG. 4 for an echo response. In particular, an echo response in 25 meters of a CAT 6 cable is shown where the amplitude of the response is plotted against time. The performance of the circuit 10 of FIG. 1 is illustrated by the waveform label "direct resistive" since all the resistors in this duplexing circuit are directly connected into the circuit. In contrast, in the duplexing circuit 32 of FIG. 2, one of the resistors is coupled through the transformer 36. This is shown by the waveform "auxiliary" in FIG. 4. As can be seen, the amplitude of the response for the circuit of FIG. 1 is substantially larger than the amplitude for the circuit of FIG. 2. Overall, the performance for the duplexing circuit of FIG. 2 is better even though the circuit of FIG. 2 has some "ringing" which continues to occur later in time. This "ringing" can be more easily dealt with than the large amplitude associated with the circuit 10 of FIG. 1.

Thus, improved front end processing has been described for a data carrying signal received over a twisted pair. Many of the impairments often removed with DSP are removed in the analog domain. This, as mentioned, significantly reduces the performance required of the A-to-D converter, and thereby provides a more readily realizable, better performing circuit and lower power consumption.

What is claimed is:

1. A method comprising:
   delaying a received signal in a plurality of serial analog stages (n);
   further delaying a signal tapped from stage n;
   combining the further delayed signal from stage n with an analog error signal to provide an analog tap weight $W_n$; and
   combining the delayed signal from stage n with $W_n$.

2. The method of claim 1, wherein the step of delaying the received signal from stage n comprises receiving a signal from stage n+a, where a is a positive integer.

3. The method of claim 1, wherein the combining of the delayed signal from stage n with $W_n$ results in a plurality of signals $X_n W_n$.

4. The method of claim 3, including summing the plurality of signals $X_n W_n$.

5. The method of claim 4, including slicing a signal resulting from the summing of the plurality of signals $X_n W_n$ to provide the analog error signal.

6. The method defined by claim 5, wherein there is a loop delay in the summing, slicing and the steps for forming the $X_n W_n$ and wherein the further delaying provides a delay equal to or greater than the loop delay.

7. The method of claim 5, wherein the step of delaying the received signal from stage n comprises receiving a signal from stage n+a, where a is a positive integer.

8. The method of claim 2, wherein the combining of the delayed signal from stage n+a with $W_n$ results in a plurality of signals $X_n W_n$.

9. The method of claim 8, including summing the plurality of signals $X_n W_n$.

10. The method of claim 9, including slicing a signal resulting from the summing of the plurality of signals $X_n W_n$ to provide the analog error signal.

11. The method defined by claim 1, wherein generation of $W_n$ includes integrating the signal from the first combining step.

12. An apparatus comprising:
   an analog delay line having a plurality of taps at each of stages (n), a first one of the stages for receiving an input signal;
   a plurality of delay circuits each coupled to a tap at a stage n of the delay line to provide a delayed signal;
   a plurality of first combining circuits, each for combining an error signal with the delayed signal from one of the delay circuits to provide a plurality of tap weights $W_n$; and
   a plurality of second combining circuits, each coupled to a stage n and coupled to receive one of the weighting signals $W_n$.

13. The apparatus of claim 12, wherein each stage of the delay line includes an inductor and a capacitor.

14. The apparatus of claim 12, wherein the first combining circuits each comprise a first analog multiplier.

15. The apparatus of claim 14, including an integrator coupled to each of the first combining circuit.

16. The apparatus of claim 14, wherein the second combining circuits each comprise a second analog multiplier.

17. The apparatus of claim 12, including a summer coupled to the plurality of second combining circuits for summing the output of the second combining circuits.

18. The apparatus of claim 17, including a slicer circuit coupled to receive a summed signal from the summer.

19. The apparatus of claim 18, wherein the first combining circuits comprise first multipliers and the second combining circuits comprise second multipliers.

20. The apparatus of claim 19, wherein each stage of the delay line comprises an inductor and capacitor.

21. An apparatus comprising:
   an analog delay line having a plurality of stages (n), a first one of the stages for receiving an input signal;
   a plurality of first combining circuits, each for combining an error signal with a signal tapped from one of the stages n+a of the delay line to provide a plurality of weighting signals $W_n$, where "a" is a positive integer; and a plurality of second combining circuits, each coupled to a stage n and coupled to receive one of the signals $W_n$.

22. The apparatus of claim 21, wherein each of the stages of the delay line has an inductor and a capacitor.

23. The apparatus of claim 22, wherein each of the first combining circuits comprises a first multiplier.

24. The apparatus of claim 23, wherein each of the second combining circuits comprise a second multiplier.

25. The apparatus of claim 24, including a summer coupled to the second multipliers.

26. The apparatus of claim 25, including a slicer coupled to the summer and the first multipliers.

* * * * *